United States Patent
Lin

(10) Patent No.: US 8,897,540 B2
(45) Date of Patent: Nov. 25, 2014

(54) OPTICAL INSPECTION METHOD

(71) Applicant: Quanta Computer Inc., Tao Yuan Shien (TW)

(72) Inventor: Chin-Lin Lin, New Taipei (TW)

(73) Assignee: Quanta Computer Inc., Tao Yuan Shien (TW)

( * ) Notice: Subject to any disclaimer, the term of this patent is extended or adjusted under 35 U.S.C. 154(b) by 144 days.

(21) Appl. No.: 13/842,921

(22) Filed: Mar. 15, 2013

(65) Prior Publication Data

US 2014/0126805 A1 May 8, 2014

(30) Foreign Application Priority Data

Nov. 8, 2012 (TW) .............................. 101141604 A

(51) Int. Cl.
*G06K 9/00* (2006.01)
*G06T 7/00* (2006.01)

(52) U.S. Cl.
CPC ....... *G06T 7/001* (2013.01); *G06T 2204/30164* (2013.01)
USPC ............. 382/149; 382/141; 382/145; 348/86; 348/125

(58) Field of Classification Search
USPC ............ 382/141, 145, 147, 149, 219; 348/86, 348/125
See application file for complete search history.

(56) References Cited

U.S. PATENT DOCUMENTS

| | | | | |
|---|---|---|---|---|
| 5,793,901 A | * | 8/1998 | Matsutake et al. | 382/294 |
| 7,013,289 B2 | * | 3/2006 | Horn et al. | 705/14.51 |
| 7,372,555 B2 | * | 5/2008 | Watanabe | 356/237.1 |
| 7,728,294 B2 | * | 6/2010 | Hiroi et al. | 250/310 |
| 8,125,632 B2 | * | 2/2012 | Watanabe | 356/237.1 |
| 8,259,295 B2 | * | 9/2012 | Watanabe | 356/237.1 |
| 8,269,969 B2 | * | 9/2012 | Hayano | 356/369 |

FOREIGN PATENT DOCUMENTS

TW 201226890 A 7/2012

* cited by examiner

*Primary Examiner* — Yosef Kassa
(74) *Attorney, Agent, or Firm* — Rabin & Berdo, P.C.

(57) ABSTRACT

An optical inspection method including the following steps is disclosed. A tester is utilized to obtain an image of an inspection object. A target image region of the image is determined. Multiple central coordinates of multiple inspection ranges of a target image region are obtained. The central coordinates are filled to an array, and then the central coordinates are reordered according to relative relationships of the central coordinates to obtain a reordered coordinate array. The reordered coordinate array is compared with an original coordinate array to inspect whether parts of the inspection object corresponding to the inspection ranges are missed.

4 Claims, 11 Drawing Sheets

| coordinate (X,Y) |
|---|
| (553,537) |
| (553,549) |
| (553,560) |
| (553,572) |
| (554,584) |
| (554,595) |
| (555,607) |
| (555,618) |
| ⋮ |

| (553,537) | (565,526) | (575,514) | (587,503) | · · · |
| --- | --- | --- | --- | --- |
| (553,549) | (564,537) | (575,525) | (586,514) | · · · |
| (553,560) | (564,548) | (576,537) | (587,525) | · · · |
| (553,572) | (564,560) | (576,548) | (587,537) | · · · |
| (554,584) | (564,572) | (576,560) | (586,548) | · · · |
| (554,595) | (564,583) | (576,571) | (587,560) | · · · |
| (555,607) | (564,594) | (576,583) | (587,572) | · · · |
| (555,618) | (565,606) | (576,594) | (587,583) | · · · |
| ⋮ | ⋮ | ⋮ | ⋮ | ⋮ |

|  |  |  | (587,503) | ... |
|---|---|---|---|---|
|  |  | (575,514) | (586,514) | ... |
|  | (565,526) | (575,525) | (587,525) | ... |
| (553,537) | (564,537) | (576,537) | (587,537) | ... |
| (553,549) | (564,548) | (576,548) | (586,548) | ... |
| (553,560) | (564,560) | (576,560) | (587,560) | ... |
| (553,572) | (564,572) | (576,571) | (587,572) | ... |
| (554,584) | (564,583) | (576,583) | (587,583) | ... |
| (554,595) | (564,594) | (576,594) | (587,594) | ... |
| ⋮ | ⋮ | ⋮ | ⋮ | ⋮ |

OPTICAL INSPECTION METHOD

This application claims the benefit of Taiwan application Serial No. 101141604, filed Nov. 8, 2012, the subject matter of which is incorporated herein by reference.

BACKGROUND OF THE INVENTION

1. Field of the Invention

The invention relates in general to an optical inspection method.

2. Description of the Related Art

According to most of the existing optical inspection methods, a golden sample is compared with an image of an inspection object placed on a production line. The so called 'golden sample' is obtained in an inspection environment (that is, a production line), and may thus be affected by various environment factors and result in multiple variations. For example, the type of the light source, the position and angle of the inspection object as well as the height and angle displacement of the optical camera may all incapacitate the use of the golden sample in different testers. Therefore, the existing optical inspection methods are not friendly in terms of system maintenance and are lacking of portability.

SUMMARY OF THE INVENTION

The invention is directed to an optical inspection method, which inspects whether parts of the inspection object are missed by a reordering algorithm without using any conventional golden samples.

According to an embodiment of the present invention, An optical inspection method including the following steps is disclosed. A tester is utilized to obtain an image of an inspection object. A target image region of the image is determined. Multiple central coordinates of multiple inspection ranges of a target image region are obtained. The central coordinates are filled to an array, and then the central coordinates are reordered according to relative relationships of the central coordinates to obtain a reordered coordinate array. The reordered coordinate array is compared with an original coordinate array to inspect whether parts of the inspection object corresponding to the inspection ranges are missed.

The above and other aspects of the invention will become better understood with regard to the following detailed description of the preferred but non-limiting embodiment(s). The following description is made with reference to the accompanying drawings.

BRIEF DESCRIPTION OF THE DRAWINGS

FIGS. 2~4A show schematic diagrams of an optical inspection method according to an embodiment of the invention;

FIG. 4B shows a table used for recording central coordinates;

DETAILED DESCRIPTION OF THE INVENTION

The invention discloses an optical inspection method, which reorders multiple central coordinates of multiple inspection ranges, compares with an original coordinate array and inspects whether parts of the inspection object are missed by a reordering algorithm without using any conventional golden sample.

Figure 1:
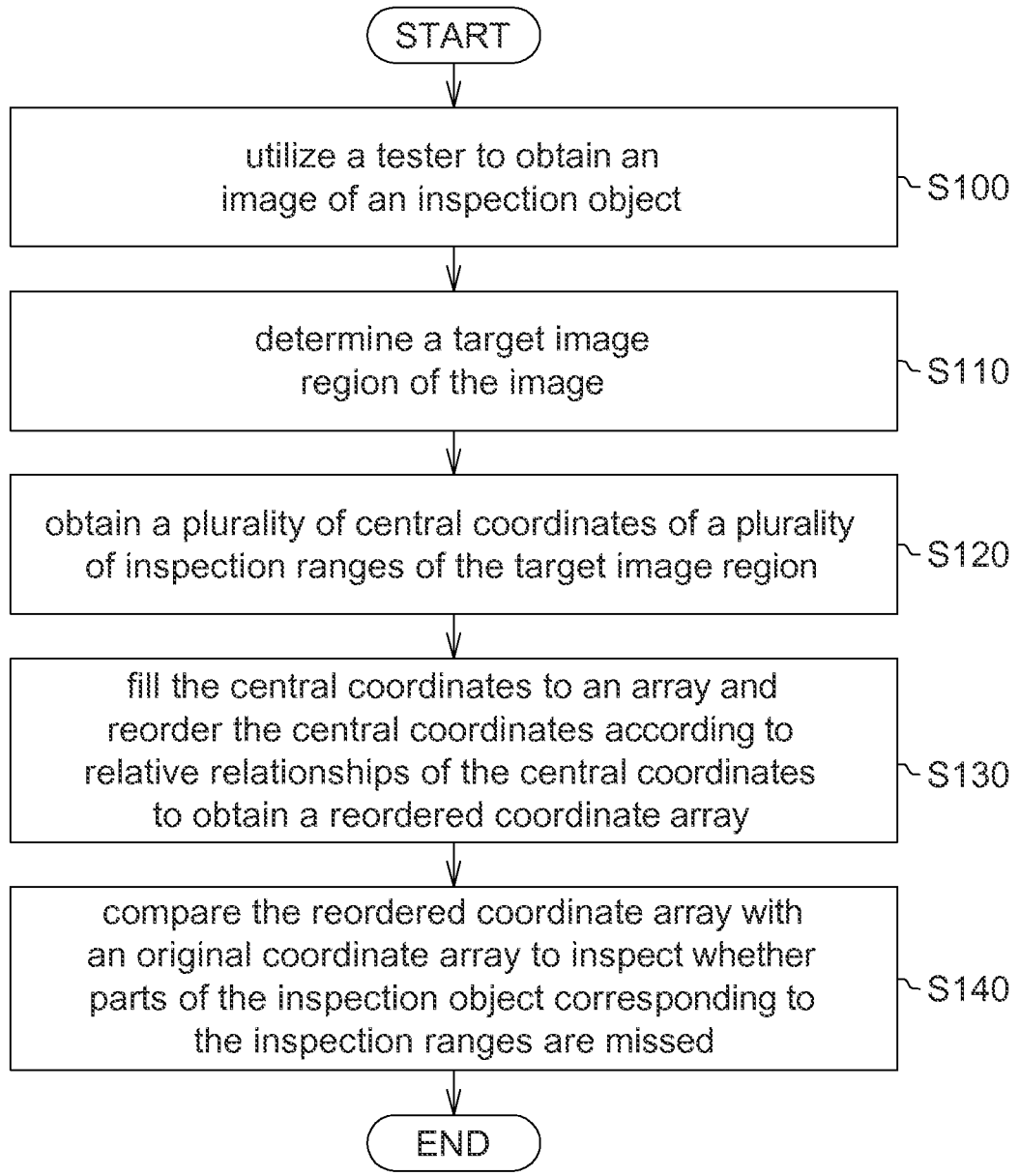
FIG. 1 shows a flowchart of an optical inspection method according to an embodiment of the invention.
Figure 2:
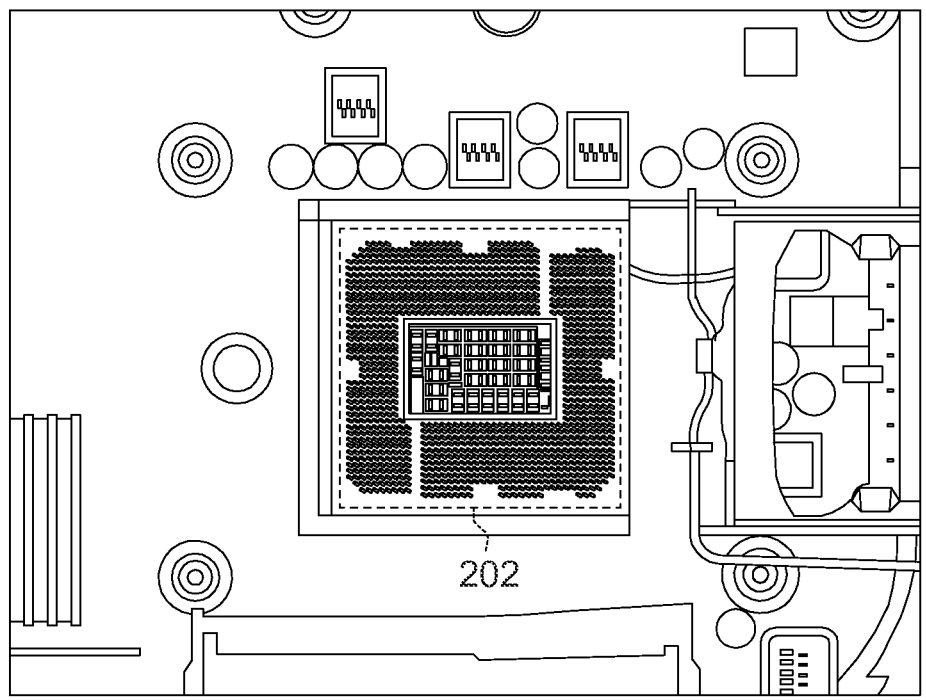
Figure 3:
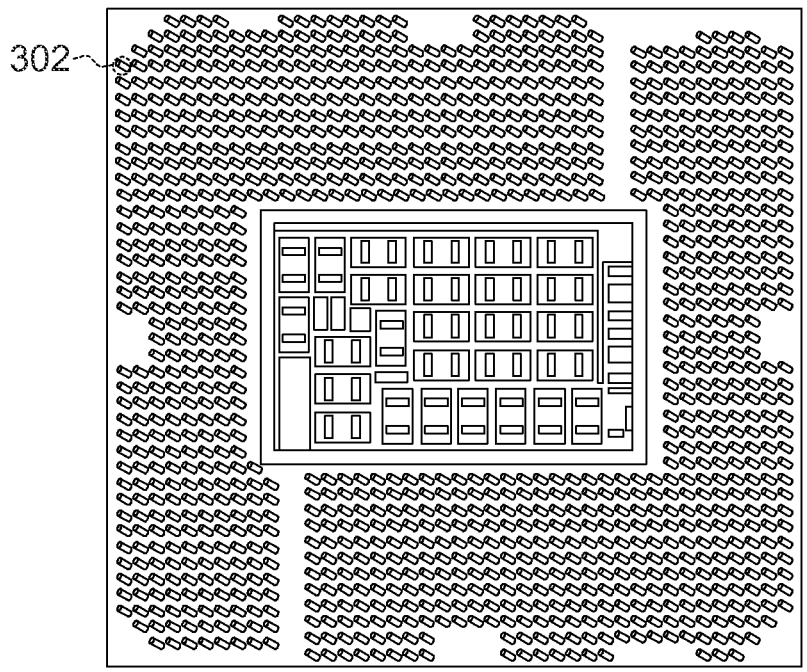
Figures 4A, 4B:
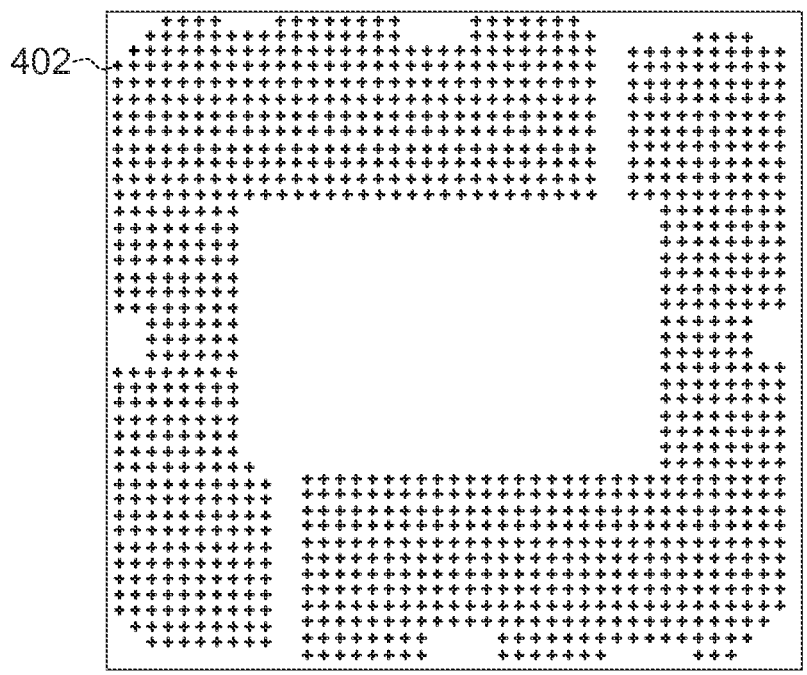

Referring to FIG. 1~FIG. 4A. FIG. 1 shows a flowchart of an optical inspection method according to an embodiment of the invention. FIGS. 2~4A show schematic diagrams of an optical inspection method according to an embodiment of the invention. Firstly, the method begins at step S100, a tester is utilized to obtain an image of an inspection object as indicated in FIG. 2, wherein the inspection object is such as a central processing unit (CPU) socket of a motherboard. Furthermore, the image will be aligned for the convenience of subsequent processing. Next, the method proceeds to step S110, a target image region 202 of the image is determined. The target image region 202 is such as a socket region of a CPU as indicated in FIG. 3. Next, the method proceeds to step S120, multiple central coordinates of multiple inspection ranges of a target image region are obtained. The target image region is further refined in step 12. The inspection range, such as inspection range 302, is the range occupied by a pin. In the above refining operation, each inspection range is refined as a single pixel point being a central point of a corresponding inspection range as indicated in FIG. 4A. For example, the pixel point 402 is the central point of the inspection range 302. Then, the coordinates of the pixel points of FIG. 4A (the central coordinates of the inspection ranges corresponding to the pins) are obtained, and the central coordinates are stored in a table of a register exemplified in FIG. 4B.

Figures 5A, 5B:
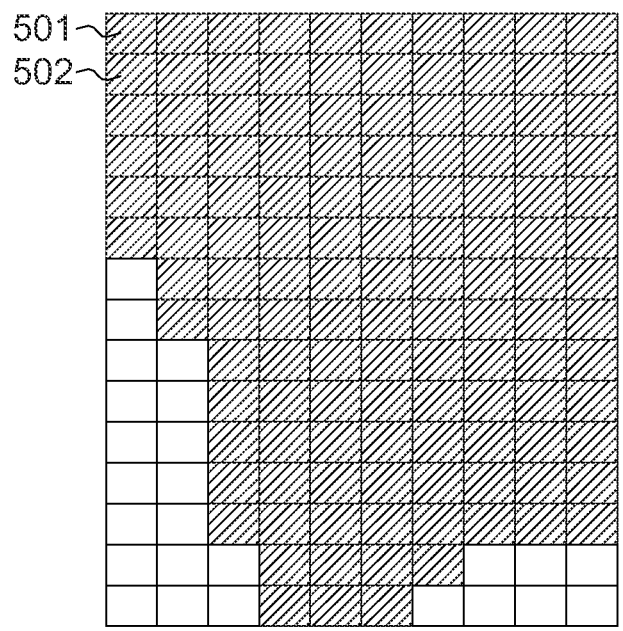
FIG. 5A shows a reordered coordinate array.
FIG. 5B shows a relationship diagram of relative positions of the pixel points corresponding to a data array of FIG. 5A.

Then, the method proceeds to step S130, the central coordinates are filled to an array, and according to relative relationships of the central coordinates reordered the central coordinates to obtain a reordered coordinate array as indicated in FIG. 5A. To save the volume of computation, multiple x coordinate ranges and multiple y coordinate ranges can be defined. In FIG. 5A, the central coordinates belonging to the same x coordinate range of the table of FIG. 4B are filled to the same column of the array and the central coordinates are reordered in an ascending order of the x coordinate according to relative relationships of the central coordinates. That is, the coordinates of all pixel points of the table of FIG. 4B are reordered, and the pixel points with similar x coordinates (that is, the pixel points belonging to the same x coordinate range) are categorized as belonging the same column. For example, the coordinates (553, 557), (553, 549), (553, 560), (553, 572), (554, 584) belong to the same column. FIG. 5B shows a relationship diagram of relative positions of the pixel points corresponding to a data array of FIG. 5A. For example, the coordinates (553, 557) and (553, 549) respectively correspond to grids 501 and 502 of FIG. 5B. The slashed grids of FIG. 5B correspond to the elements of the data array of FIG. 5A having coordinates. The blank grids correspond to the elements of the data array of FIG. 5A not having coordinates. For convenience of elaboration, FIG. 5B shows a simplified relationship diagram of relative positions of pixel points schematically corresponding to the array of FIG. 5A.

Figures 6A, 6B:
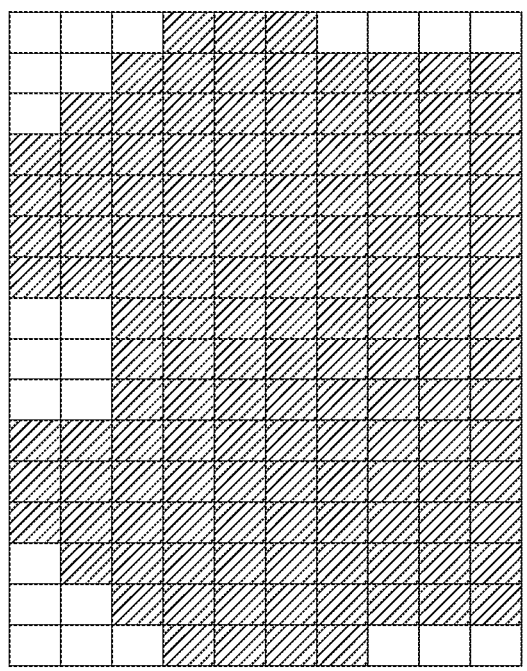
FIG. 6A shows another reordered coordinate array.
FIG. 6B shows a relationship diagram of relative positions of the pixel points corresponding to a data array of FIG. 6A.

Then, the image is aligned. Based on the relative relationships of the central coordinates of FIG. 5A, the central coordinates belonging to the same y coordinate range are shifted and filled to the same row of the array, and the central coordinates are reordered in an ascend order of the y coordinates. That is, the coordinates of all pixel points of the table of FIG. 5A are reordered, and the pixel points with similar y coordinates (that is, the pixel points belonging to the same y coordinate range) are categorized as belonging to the same row. For example, the coordinates (553, 537) and (553, 549) are shifted downward for 3 units, the coordinates (565, 526) and (564, 537) are shifted downward for 2 units, and the coordinates (575, 514) and (575, 525) are shifted downward for 1 unit, such that the coordinates (575, 514) and (586, 514) are located at the same row, the coordinates (565, 526), (575, 525) and (587, 525) are located at the same row, and other rows can be obtained by the same analogy. Thus, another reordered coordinate array as indicated in FIG. 6A can be obtained. The reordered coordinate array denotes the relative relationship of the inspection ranges of FIG. 3. FIG. 6B shows a relationship diagram of relative positions of the pixel points corresponding to a data array of FIG. 6A. The slashed grids of FIG. 6B correspond to the elements of the data array of FIG. 6A having coordinates. The blank grids correspond to the elements of the data array of FIG. 6A not having coordinates. For convenience of elaboration, FIG. 6B shows a simplified relationship diagram of relative positions of pixel points schematically corresponding to the array of FIG. 6A.

Then, the method proceeds to step S140, the reordered coordinate array is compared with an original coordinate array to inspect whether parts of the inspection object corresponding to the inspection ranges are missed. The original coordinate array is obtained from the central coordinates of the inspection ranges of the inspection object in the original design according to the principles of FIGS. 4B~6B. Of the reordered coordinate array and the original coordinate array, parts of the inspection object corresponding to unmatched elements are missed. In the present embodiment, the pin in the inspection range corresponding to the unmatched element is either absent or tilted.

Figure 7:
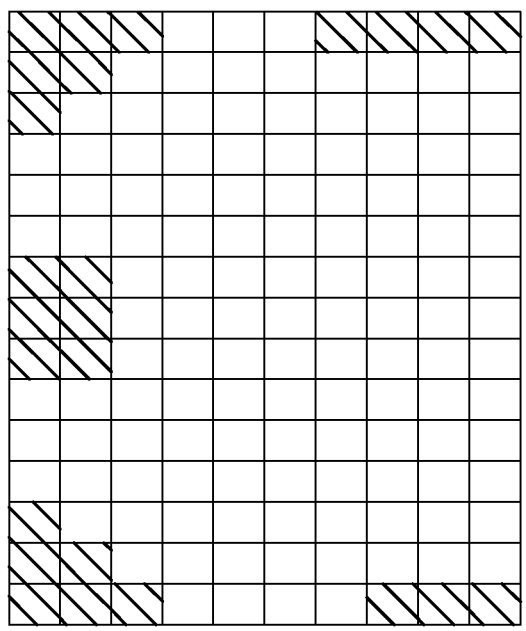
FIG. 7 shows a relationship diagram of relative positions of the pixel points corresponding to the specification of the invention.
Figure 8:
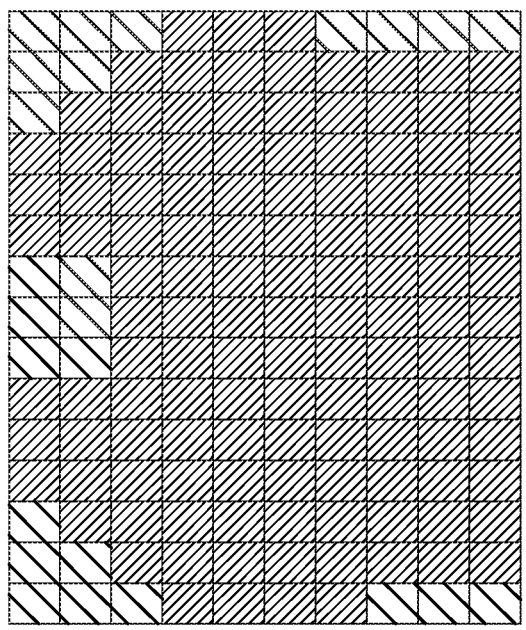
FIG. 8 shows a relationship diagram of relative positions of the fully compensated pixel points obtained by combining FIGS. 7 and 6B together.

Details of step S140 are exemplified below. Firstly, based on the specification of the inspection object of FIG. 2 (the inspection object is such as a CPU socket of a motherboard), the positions originally not having any pins are marked in a relationship diagram of relative positions of the pixel points as indicated in FIG. 7. For example, these positions are denoted by inversely slashed grids. Then, compensation is performed. The relationship diagram of relative positions of the pixel points as indicated in FIG. 7 and the relationship diagram of relative positions of the pixel points as indicated in FIG. 6B are combined to generate a fully compensated relationship diagram of relative positions of the pixel points as indicated in FIG. 8. Then, comparison is performed to inspect whether any parts of the fully compensated pixel points as indicated in FIG. 8 are missed. That is, whether there exist any blank grids not filled with slashed lines is determined. If so, this implies that the pins of the inspection ranges corresponding to the blank grids are either absent or tilted.

Figure 9:
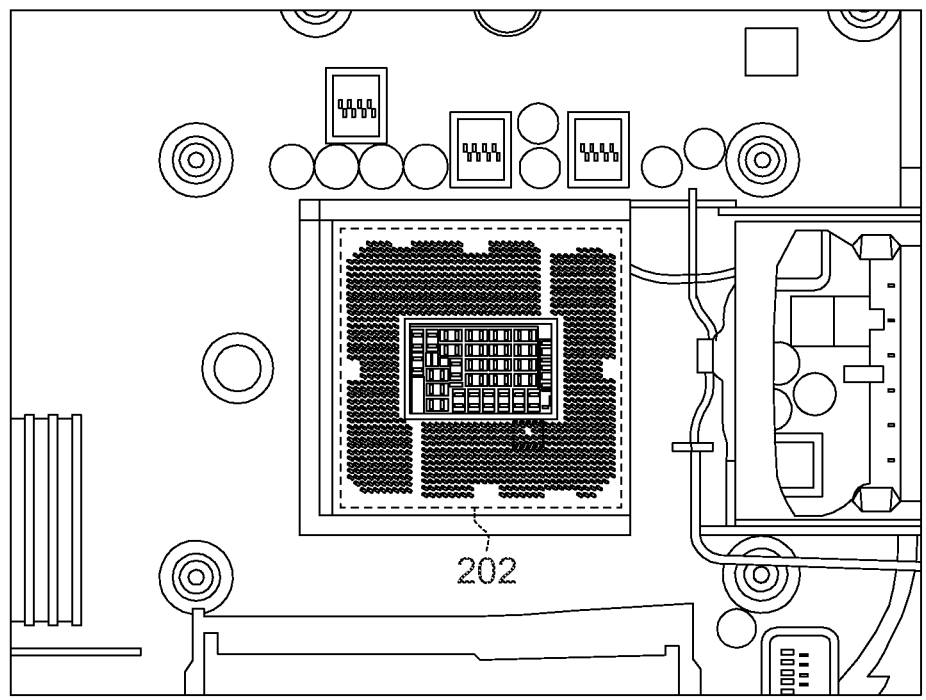
FIG. 9 shows a schematic diagram of a defective inspection object.
Figure 10:
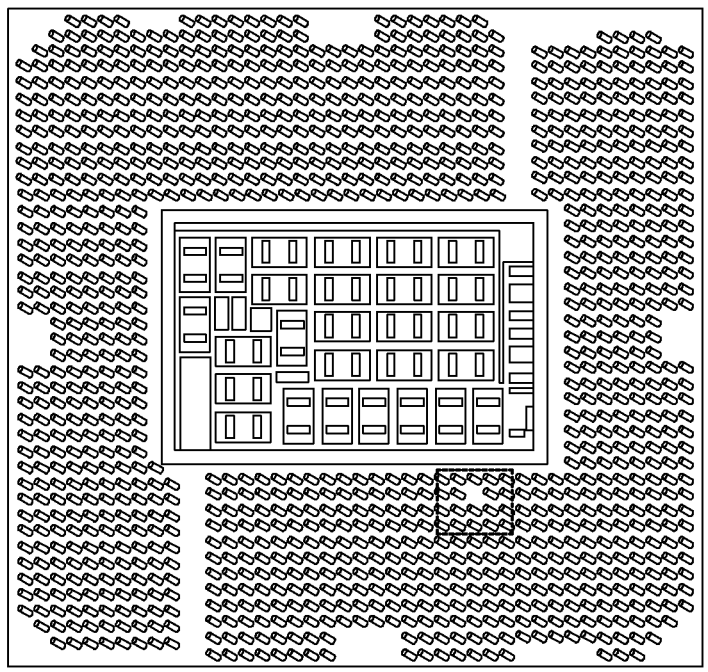
FIG. 10 shows a schematic diagram of a target image region extracted from FIG. 9.
Figure 11:
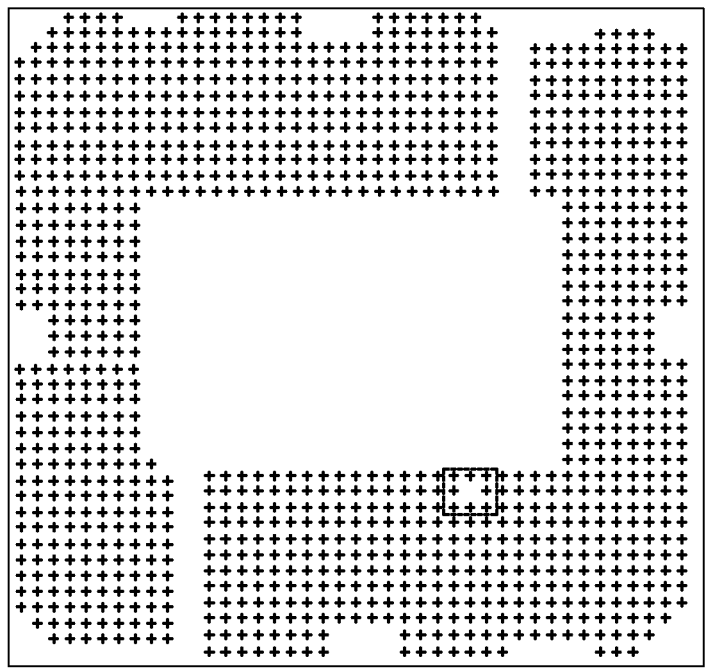
FIG. 11 shows a refined diagram of FIG. 10.
Figure 12:
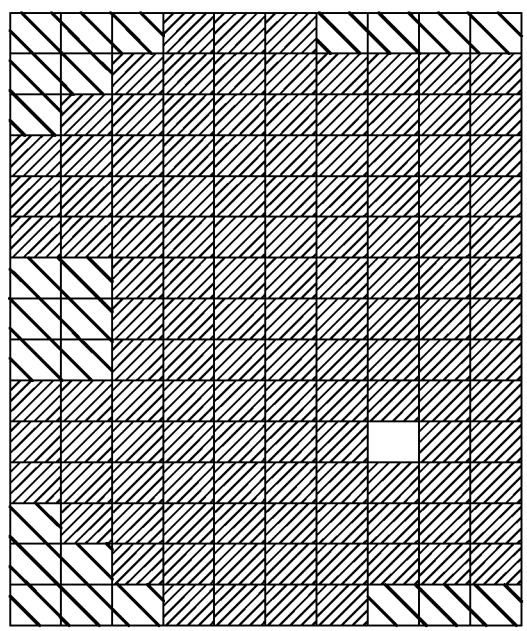
FIG. 12 shows a relationship diagram of relative positions of the fully compensated pixel points corresponding to FIG. 10.

Let the optical inspection method of FIG. 1 be used in a defective CPU socket. Referring to FIG. 9~12. FIG. 9 shows a schematic diagram of a defective inspection object. FIG. 10 shows a schematic diagram of a target image region extracted from FIG. 9. FIG. 11 shows a refined diagram of FIG. 10. FIG. 12 shows a relationship diagram of relative positions of the fully compensated pixel points corresponding to FIG. 10. The dotted ranges of FIG. 9~11 correspond to the missed pins. As indicated in FIG. 12, the blank grids denote the relative positions between the missed pins and other pins. Thus, the CPU socket has missed pins and is determined as a defective product. Based on the method of the present embodiment, whether parts of the inspection object are missed can be determined according to the image of the inspection object and the relative positions of the pins without using any conventional golden samples, so that the inspection of the inspection object will be less affected by the variation in environment factors. Examples of environment variation include the inclination of the inspection object, the position of the inspection object on a conveyor, the type, intensity and radiating direction of an ambient light, and the height and angle of an image capturing device.

Figure 13:
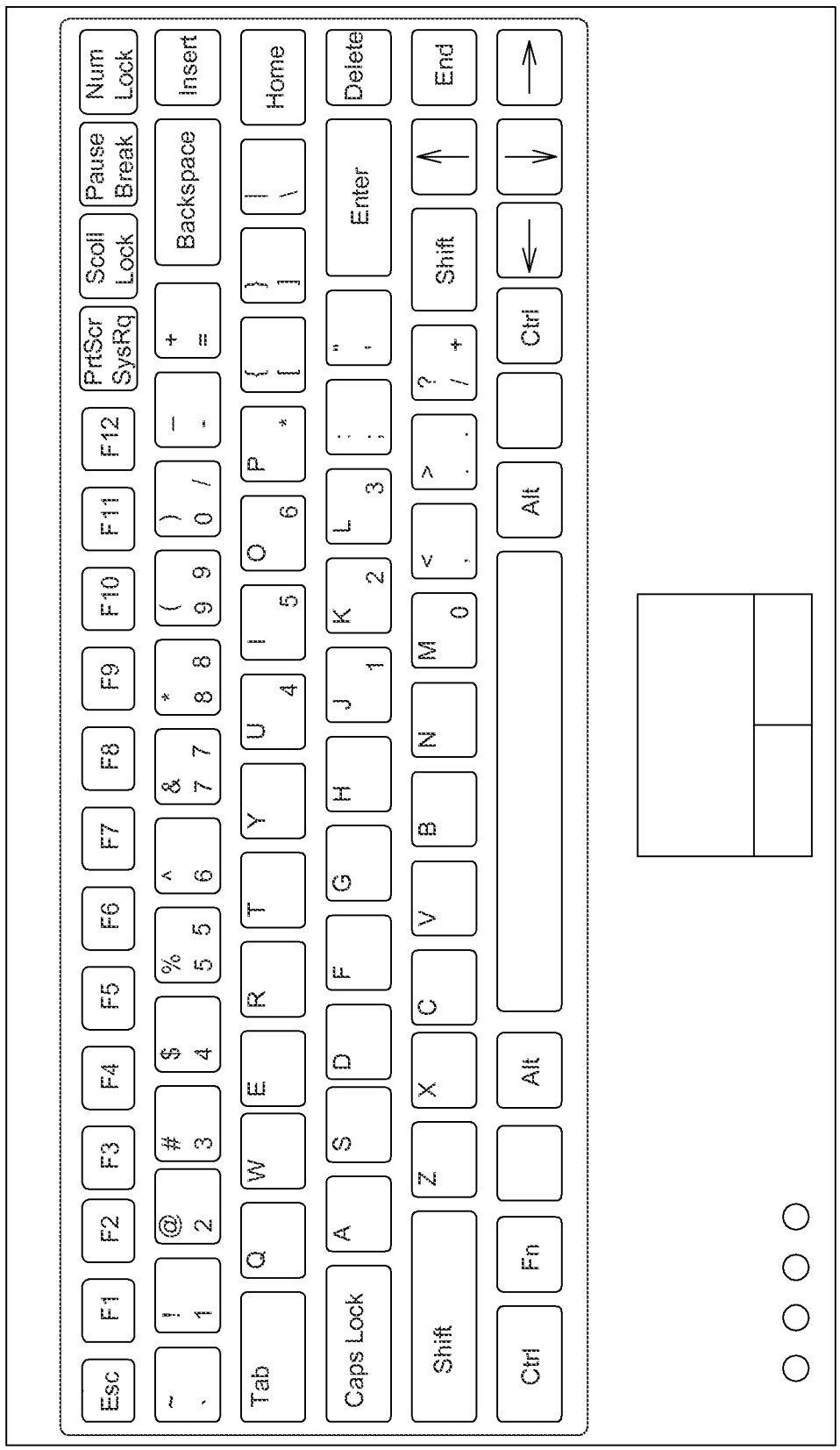
FIGS. 13~15 show schematic diagrams of an optical inspection method according to another embodiment of the invention.
Figure 14:
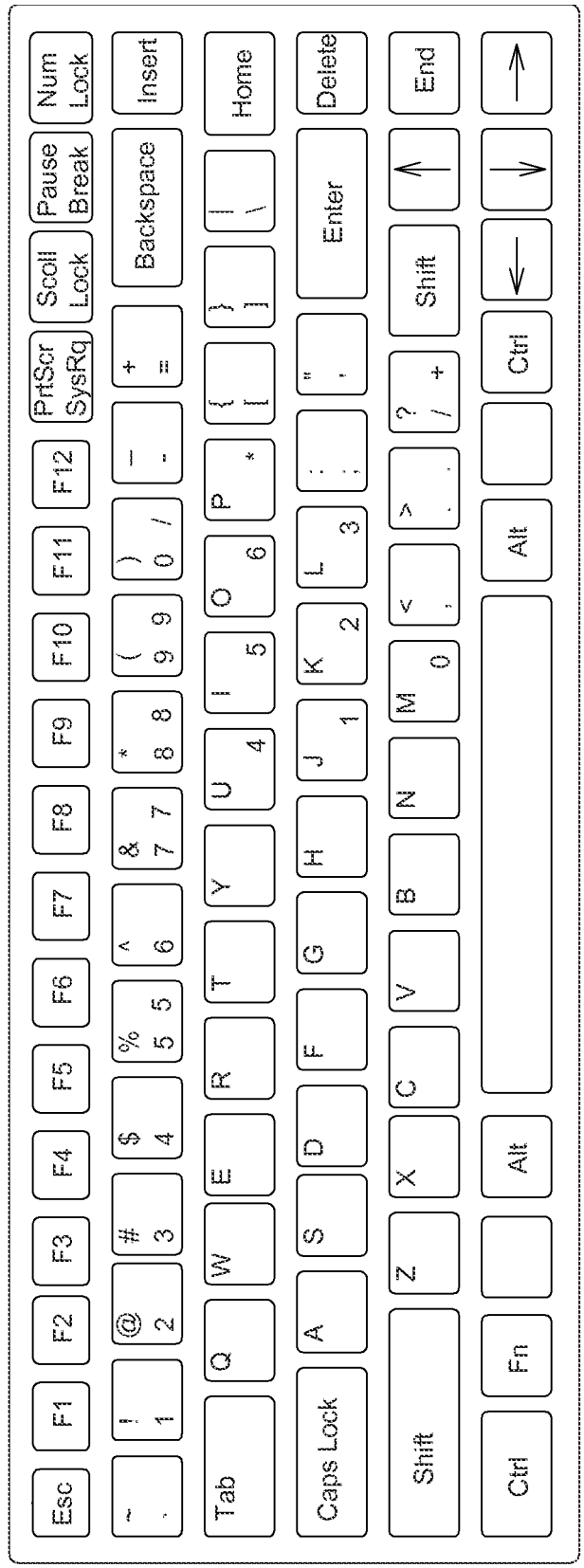
Figure 15:
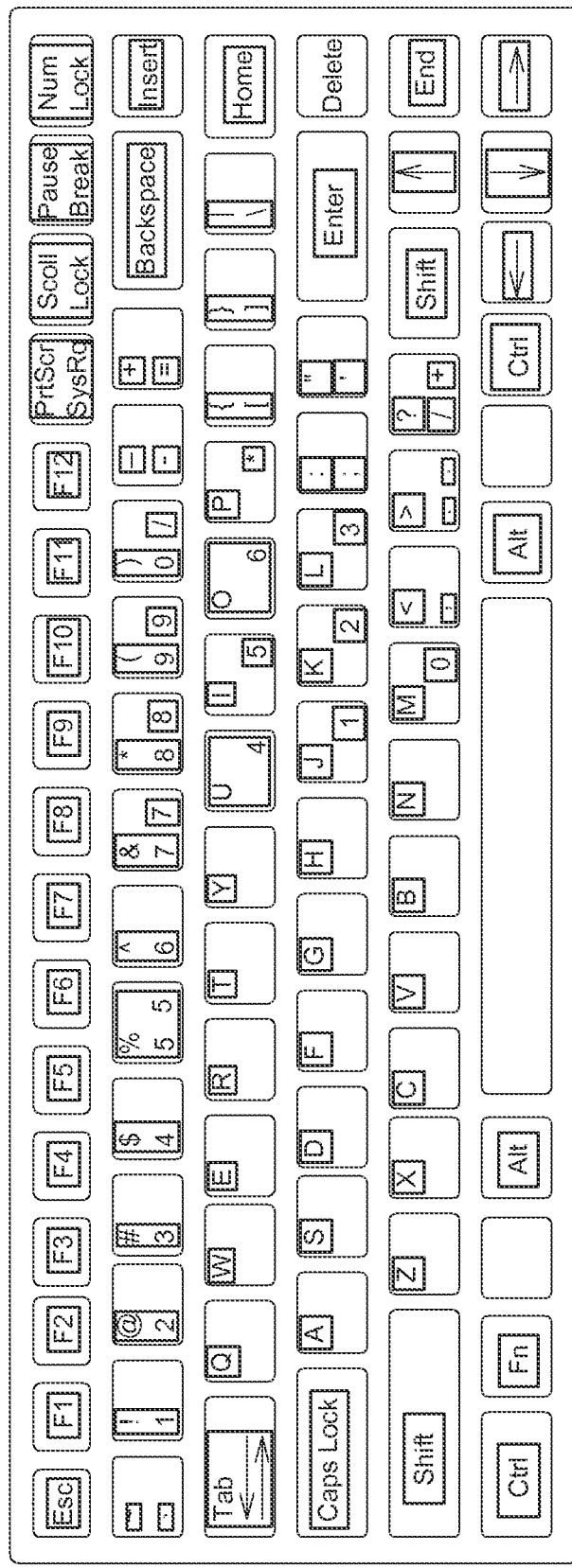

Let the inspection object be a keyboard. Referring to FIGS. 13~15, schematic diagrams of an optical inspection method according to another embodiment of the invention are shown. As indicated in FIG. 13, the image of a keyboard is aligned for the convenience of subsequent processing. As indicated in FIG. 14, the target image region is the press key region to be inspected. As indicated in FIG. 15, multiple central coordinates of multiple inspection ranges of the target image region are detected. The so called 'inspection range' refers to the lineament of the text. Then, the central coordinates are reordered according to the principles of FIG. 4B~FIG. 6B to obtain a reordered coordinate array. The reordered coordinates array is further compared with an original coordinate array based on the original design of the keyboard to inspect whether parts of the keys corresponding to the lineament of the text are missed. Of the reordered coordinate array and the original coordinate array, the printed text within the lineament range of the text corresponding to unmatched elements may be incorrect or unprinted.

According to an optical inspection method disclosed in an embodiment of the invention discloses, multiple central coordinates of multiple inspection ranges are reordered to obtain a reordered coordinate array, the reordered coordinate array is compared with an original coordinate array based on the original design of the inspection object, and whether parts of the inspected object are missed is inspected by using a reordering algorithm without using any conventional golden samples. The optical inspection method is conducive to the maintenance of system and has a high degree of portability.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:
1. An optical inspection method, comprising:
utilizing a tester to obtain an image of an inspection object;
determining a target image region of the image;
obtaining a plurality of central coordinates of a plurality of inspection ranges of the target image region;

filling the central coordinates to an array and reordering the central coordinates according to relative relationships of the central coordinates to obtain a reordered coordinate array; and comparing the reordered coordinate array with an original coordinate array to inspect whether parts of the inspection object corresponding to the inspection ranges are missed.

2. The optical inspection method according to claim 1, further comprising:

aligning the image and obtaining the target image region from the aligned image.

3. The optical inspection method according to claim 1, wherein the step of reordering the central coordinates comprises:

defining a plurality of x coordinate ranges and a plurality of y coordinate ranges; and filling the central coordinates belonging to the same x coordinate range to the same column of the array and filling the central coordinates belonging to the same y coordinate range to the same row of the array according to relative relationships of the central coordinates to obtain the reordered coordinate array.

4. The optical inspection method according to claim 1, wherein, parts of the inspection object corresponding to an unmatched element of the reordered coordinate array and the original coordinate array are missed.

\* \* \* \* \*